United States Patent [19]

Baird

[11] 3,911,805
[45] Oct. 14, 1975

[54] APPARATUS FOR CUTTING, SHAPING AND TRANSFERRING FLEXIBLE PREFORMS

[75] Inventor: James Clark Baird, Cincinnati, Ohio

[73] Assignee: The Procter & Gamble Company, Cincinnati, Ohio

[22] Filed: Dec. 24, 1974

[21] Appl. No.: 536,148

[52] U.S. Cl. ................ 99/353; 83/561; 99/404; 99/427; 425/304; 425/305 R
[51] Int. Cl.[2] .................. A21C 11/10; A47J 37/00
[58] Field of Search ....... 83/561; 425/305 R, 302 R, 425/304; 99/353, 355, 404, 407, 426, 427, 450.2, 450.3

[56] References Cited
UNITED STATES PATENTS

| | | | |
|---|---|---|---|
| 3,495,491 | 2/1970 | Nungesser et al. | 83/561 |
| 3,520,248 | 7/1970 | MacKendrick | 99/353 |
| 3,570,393 | 3/1971 | Schy | 99/404 |
| 3,767,740 | 10/1973 | Hintan et al. | 425/302 R |

Primary Examiner—William D. Martin, Jr.
Assistant Examiner—Steven L. Stephan
Attorney, Agent, or Firm—Thomas J. Slone; John V. Gorman; Richard C. Witte

[57] ABSTRACT

An apparatus for cutting flexible preforms having a predetermined initial shape from a flexible web such as a ribbon of dough, and for pneumatically transferring the preforms to moving cooking molds having a final shape substantially different from the initial shape of the preforms. The apparatus includes means for distributing cutting wear induced on a rotating anvil roll by a rotating cutter roll, and means for uniformly shaping the preforms to at least one predetermined intermediate shape prior to pneumatically transferring the preforms on-the-fly to moving cooking molds. Factors such as windage which affect the shapes of flexible preforms during high velocity pneumatic transfers are substantially reduced by incrementally changing the shapes of the preforms as opposed to effecting a relatively large shape change in one step.

11 Claims, 16 Drawing Figures

APPARATUS FOR CUTTING, SHAPING AND TRANSFERRING FLEXIBLE PREFORMS

FIELD OF THE INVENTION

This invention relates generally to providing apparatus for making uniformly shaped articles such as snack food products. More specifically, the present invention provides improved apparatus for cutting preforms from a flexible, endless ribbon or web of dough, and for pneumatically transferring the preforms on-the-fly to uniformly shaped cooking molds moving through a cooking machine.

BACKGROUND OF THE INVENTION

Manufacturing uniformly shaped snack food products commonly involves milling or extruding an endless ribbon or web of dough, cutting preforms from the web through the use of a cutter roll and an anvil roll, and pneumatically depositing the preforms onto shaped molds such as cooking or frying molds which transport the preforms through a cooking zone.

A method of packaging, and a package of crisp, uniformly saddle-shape, chip-type snack food products is disclosed in U.S. Pat. No. 3,498,798 which issued Mar. 3, 1970 to Fredric J. Baur et al.

A Chip Frying Machine for making such a crisp, uniformly saddle-shape, chip-type snack food product is disclosed in U.S. Pat. No. 3,520,248 which issued July 14, 1970 to Robert G. MacKendrick. For convenience, that patent is hereby incorporated by reference and the preferred embodiment of the present invention is described as an improvement of the Chip Frying Machine disclosed in that patent. It is not intended, however, to thereby limit the scope of the present invention.

The Chip Frying Machine referenced above comprises a rotating cutter roll and a plastic-sleeved anvil roll for cutting arcuate-shape preforms from an endless ribbon or web of dough. That machine further comprises vacuum means for securing the preforms to predetermined perforate areas of the periphery of the anvil roll, and pneumatic means for blowing the cut preforms onto a moving flight of saddle-shape fry molds. The cutter and anvil rolls are rotationally indexed with respect to each other. Therefore, cutter induced wear is confined to relatively infinitesimal areas of the anvil roll where the cutting edges of the cutters repeatedly contact the same portions of the periphery of the anvil roll.

Still referring to the Chip Frying Machine referenced above, direct, on-the-fly pneumatic transfers of arcuate shape, flexible preforms to saddle-shape frying molds involves a substantial shape change. These transfers sometimes precipitate folded and/or wrinkled preforms due to such factors as windage. Folded and wrinkled preforms result in undesirable, non-uniform finished products.

Windage effects on flexible preforms during pneumatic transfers are, of course, directly related to the velocity of the flight of molds, the lengths of the free flight paths of the preforms during the pneumatic transfers, and the degree of shape changing incident to the transfers.

The present invention provides means for having an anvil roll having an imperforate plastic surface creep rotationally with respect to a cutter roll in order to distribute cutter induced wear over a substantial area of the periphery of the anvil roll. Furthermore, the present invention spaces a plastic surfaced anvil roll remotely with respect to hot areas or zones of a cooking machine whereby the plastic surface of the anvil roll is protected from deleterious heat. The present invention also provides means for reducing the incidence of non-uniform shape products by incrementally changing the shapes of the preforms as opposed to effecting relatively large shape changes in one step, and by reducing free-flight path lengths of preforms during pneumatic transfers through the use of nesting but non-contacting transfer members and molds.

OBJECTS OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A principal object of the present invention is providing an improved apparatus for cutting preforms from a flexible sheet of heat-setable material and for depositing the preforms onto cooking molds in a cooking machine wherein the preforms are converted into relatively inflexible, uniformly shaped products.

Another object of the present invention is providing a preform cut-and-transfer apparatus as described in the preceding paragraph which apparatus comprises improved means for extending the service life of the anvil roll.

Still another object of the present invention is providing a preform cut-and-transfer apparatus in a cooking machine wherein the shape of the preform is incrementally changed from its initial as-cut shape to a substantially different final shape in order to more positively achieve the desired final shape.

SUMMARY OF THE INVENTION

The above and other objects of the present invention are achieved by providing an apparatus for cutting arcuate-shape preforms from a web of dough, for transferring the preforms to final-shape cooking molds in a cooking machine, and for uniformly shaping the preforms to at least one predetermined intermediate shape prior to transferring the preforms to the cooking molds. The apparatus comprises a frame, a cutter roll, an anvil roll, an intermediate shaping-transfer cylinder, and means for rotating the rolls and cylinder in predetermined timed relation with respect to each other and with respect to the cooking molds. The cutter roll is rotatably secured to the frame and has an array of preform cutting edges on its periphery. The anvil roll is rotatably secured to the frame so that a cutting nip is formed intermediate the cutter roll and the anvil roll, and so that the cutting edges on the cutter roll contact the periphery of the anvil roll at the cutting nip whereby a web of dough forwarded to the cutting nip in timed relation with the rotation of the rolls is converted at the cutting nip into a plurality of arcuate-shape preforms, and a lace-like strip of scrap. The intermediate shaping-transfer cylinder is rotatably secured to the frame so that a first transfer station is formed intermediate one of the rolls and the cylinder, and so that an other transfer station circumferentially spaced from the first transfer station is formed adjacent the shaping-transfer cylinder. The shaping-transfer cylinder has a plurality of intermediate-shape members disposed about its periphery. The apparatus further comprises means for having vacuum and pressurized gas conducted through the one roll and the cylinder so that preforms are secured by vacuum to the one roll intermediate the cutting nip and the first transfer station, then pneumatically transferred onto the intermediate-shape members of the shaping-transfer cylinder at the first transfer station, then secured by vacuum to the intermediate-shape members intermediate the first transfer station and the other transfer station, and then pneumatically blown off the intermediate-shape members of the shaping-transfer cylinder at the other transfer station. The periphery of the anvil roll may be sufficiently soft with respect to the cutters to substantially confine cutting induced wear to the periphery of the anvil roll, and the means for rotating the rolls may cause the anvil roll to creep rotationally with respect to the cutter roll in order to circumferentially distribute cutting induced wear about the periphery of the anvil roll. The shaping-cylinder and the intermediate-shape members on its periphery may be so configured and disposed with respect to the flight of cooking molds that the members non-contactingly nest with cooking molds at the other transfer station.

BRIEF DESCRIPTIONS OF THE DRAWINGS

While the specification concludes with claims particularly pointing out and distinctly claiming the subject matter regarded as forming the present invention, it is believed the invention will be better understood from the following description taken in connection with the accompanying drawings in which:

DESCRIPTION OF THE PREFERRED EMBODIMENT

Figures 1, 3, 4, 5, 6:
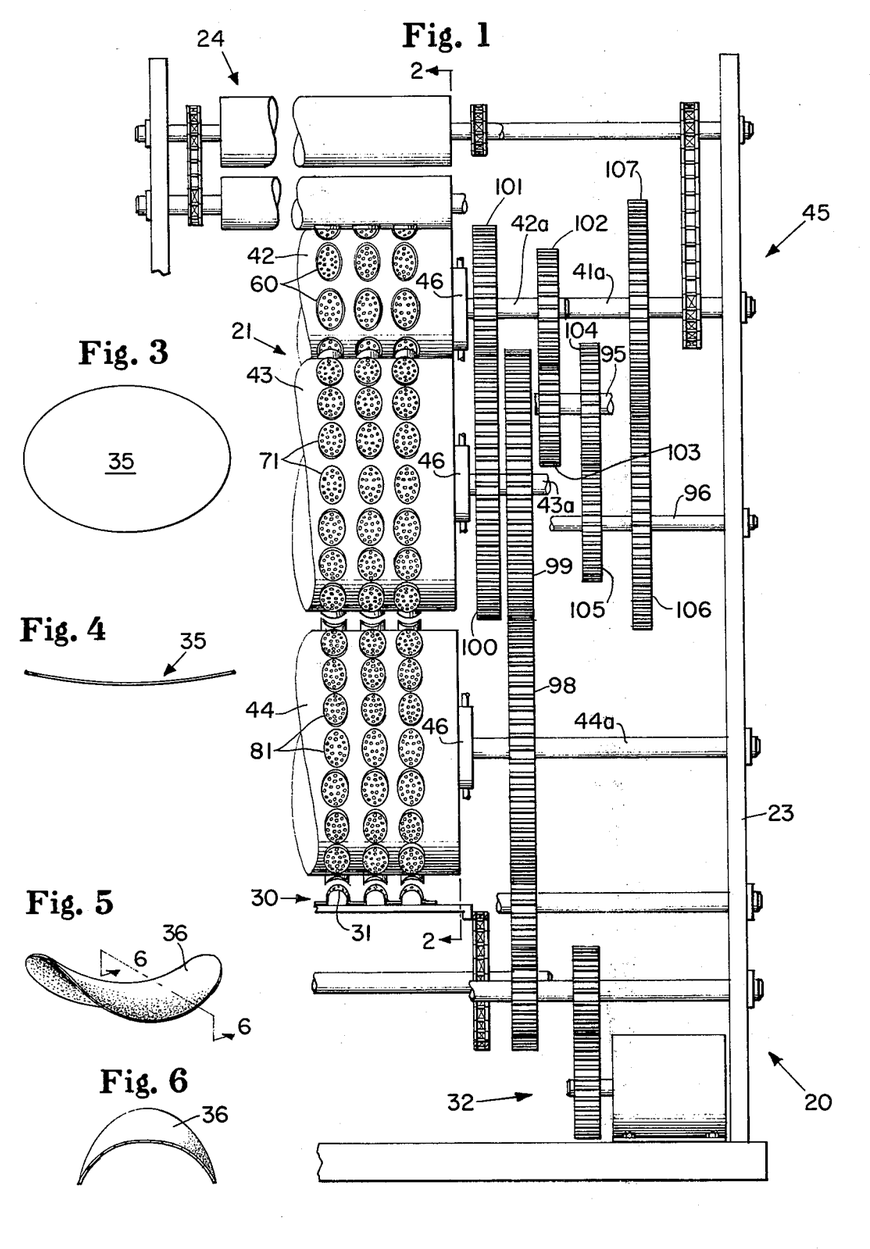
FIG. 1 is a fragmentary, front elevational view of a cooking machine comprising a preferred cut-and-transfer apparatus embodiment of the present invention.
FIG. 3 is a top view of a flexible preform cut from an endless ribbon of dough.
FIG. 4 is a side view of the flexible preform shown in FIG. 3 which side view shows the initial arcuate shape of the preform.
FIG. 5 is a perspective view of a saddle-shape, chip-type snack food product having upswept ends and down-turned sides.
FIG. 6 is a sectional view of the snack food product shown in FIG. 5 which view has been taken along line 6—6 of FIG. 5.
Figure 2:
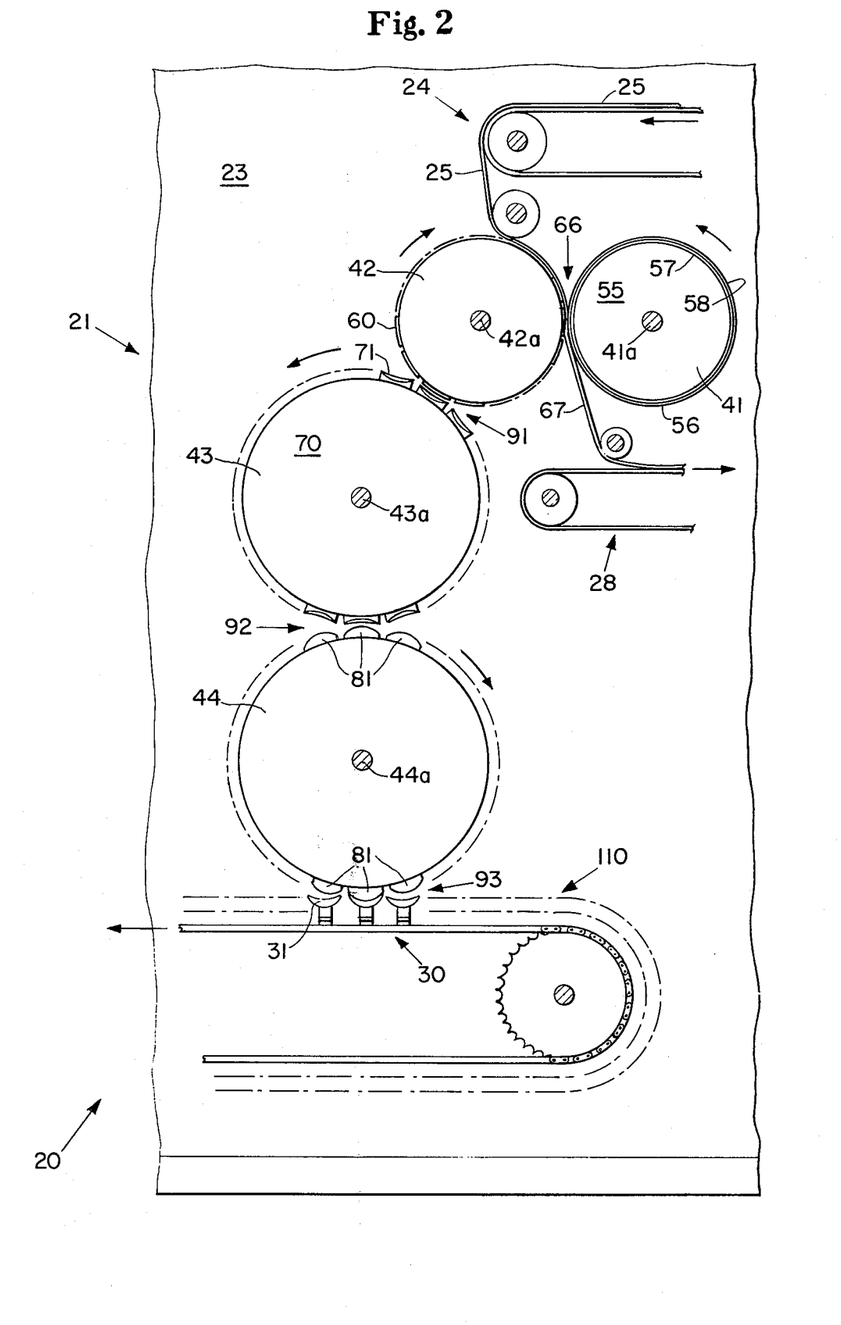
FIG. 2 is a fragmentary, sectional view of the apparatus shown in FIG. 1 which view has been taken along line 2—2 thereof.

A fragmentary portion of a cooking machine 20 is shown in FIGS. 1 and 2 to comprise an improved cut-and-transfer apparatus 21, a frame 23, infeed means 24 for forwarding a continuous, flexible ribbon 25 to the cut-and-transfer apparatus 21, scrap removal means 28, a flight 30 of molds 31, and drive means 32. The improved cut-and-transfer apparatus 21 is a preferred embodiment of the present invention.

But for incorporating the preferred embodiment cut-and-transfer apparatus 21, cooking machine 20 as described hereinafter is the Chip Frying Machine disclosed in U.S. Pat. No. 3,520,248 which patent has hereinbefore been incorporated by reference. It is not intended, however, to thereby limit the scope of the present invention. Rather, describing the improved cut-and-transfer apparatus 21 as being incorporated in a Chip Frying Machine of the type disclosed in U.S. Pat. No. 3,520,248 is intended to elucidate the present invention by disclosing an exemplary application thereof.

Briefly, the principal function of the cut-and-transfer apparatus 21 is to cut preforms 35, FIGS. 3 and 4, from a continuous flexible ribbon 25 of material such as a web of heat-setable dough, FIG. 1, and to deposit the preforms 35, on-the-fly, onto the moving flight 30, FIG. 2, of uniformly-shaped molds 31 whereon the preforms 35 can be converted into relatively inflexible, uniformly-shaped products such as a snack-food chip 36, FIG. 5. The preforms 35 have an arcuate-shape, FIG. 4, when cut due to the cylindrical periphery of the cutter roll 42, FIG. 1. The arcuate-shape preforms 35 are incrementally reshaped through the use of intermediate-shape members disposed on shaping-transfer cylinders 43, 44 respectively, FIGS. 1 and 2, so that when the preforms 35 are deposited onto the saddle-shape molds 31, the preforms 35 will consistently assume the saddle-shape of the molds 31. Such incremental reshaping of flexible preforms 35 to achieve relatively large shape changes results in more uniformly shaped finished products 36 as opposed to attempting to effect relatively large shape changes in one step.

In addition to comprising means for incrementally reshaping flexible preforms, the preferred embodiment cut-and-transfer apparatus 21 comprises means for achieving a substantially greater service life for an anvil roll than prior art cut-and-transfer apparatuses. These means include spacing the anvil roll 41, FIG. 2, remotely from hot elements of cooking machine 20 to protect its thermoplastic periphery from deleterious heat, and means for causing the anvil roll 41 to creep rotationally with respect to the cutter roll 42 to circumferentially distribute cutter induced wear over a substantial area of the thermoplastic periphery of anvil roll 41.

Cut and transfer apparatus 21, FIGS. 1 and 2, comprises a frame such as a portion of frame 23, an anvil roll 41, a cutter roll 42, a first shaping-transfer cylinder 43, a second shaping-transfer cylinder 44, means 45, FIG. 1, for rotatably mounting and rotating rolls 41, 42 and cylinders 43, 44 to the frame in predetermined relations as delineated hereinafter, and rotary valving means 46.

Anvil roll 41, FIG. 2, preferably comprises a core 55, and a two layer sleeve-type cover 56 comprising an inner layer 57 and an outer layer 58. The core 55 is preferably relatively inelastic material such as steel or iron or the like. The inner layer 57 of the cover 56 is preferably of resilient material such as hard rubber, polyethylene, polypropylene, or the like, and the outer layer 58 of the cover 56 is of a harder, imperforate, wear-and-cut resistant material having good release properties with respect to a web of dough. Such a material for making the outer layer is Teflon, a fluorocarbon polymer available from the E. I. DuPont Company of Wilmington, Delaware. The imperforate surface of the outer layer 58 permits the anvil roll 41 to be rotated in such a manner that it creeps rotationally with respect to the cutter roll 42 as described more fully hereinafter.

Figure 7:
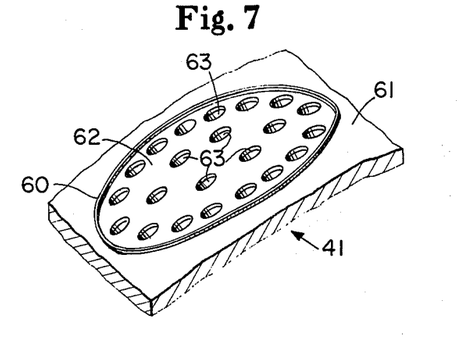
FIG. 7 is an enlarged scale, fragmentary perspective view showing one cutting edge of a cutter roll.

Cutter roll 42, FIGS. 1 and 2, is provided with an array of cutting edges 60 on its periphery 61 and, as here shown, the array comprises 12 circumferentially spaced, axially extending rows of cutting edges 60. Referring now to FIG. 7, each cutting edge 60 encircles an area 62. A plurality of passageways 63, here shown as 22 in number, extend radially inwardly from each area 62. All of the passageways 63 from each axially extending row of areas 62 encircled by cutting edges 60 communicate with an internal, axially extending manifold (not shown). These manifolds enable rotational valving means 46, FIG. 1, to secure preforms to areas 62 by vacuum, and to pneumatically remove the preforms from areas 62 as is descirbed more fully hereinafter.

The anvil roll 41 and the cutter roll 42, FIGS. 1 and 2, are secured to shafts 41a and 42a respectively which are rotatably secured to frame 23 so that a cutting nip 66 is formed between rolls 41 and 42. The cutting edges 60 on cutter roll 42 contact the outer layer or periphery 58 of anvil roll 41 at cutting nip 66 so that a web 25 of dough passing through cutting nip 66 is converted into a plurality of preforms 35, FIGS. 3 and 4, and a lace-like strip of scrap 67, FIG. 1.

The first shaping-transfer cylinder 41, FIGS. 1 and 2, comprises a cylindrical drum 70 having an array of first-intermediate-shape members 71 disposed on its cylindrical surface and, as here shown, the array comprises 20 circumferentially spaced axially extending rows of first-intermediate-shape members 71.

Figure 8:
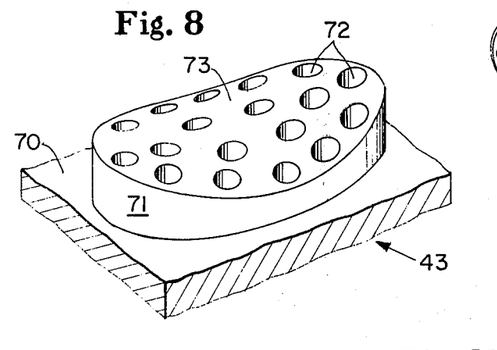
FIG. 8 is an enlarged scale, fragmentary perspective view showing a first intermediate-shape member on a first shaping-transfer cylinder.
Figure 10:
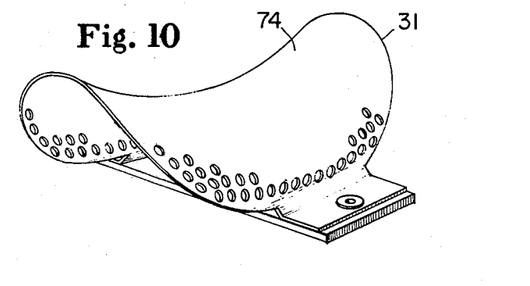
FIG. 10 is an enlarged scale, perspective view of a cooking mold.

Each of the first-intermediate-shape members 71, FIG. 8, has a plurality of passageways 72, here shown as eighteen in number, which extend radially inwardly from its face 73. The face 73 is configured to have a shape intermediate the arcuate shape of a preform 35, FIG. 4, when it is cut, and the shape of the top surface 74 of a mold 31, FIG. 10.

The second shaping-transfer cylinder 44, FIGS. 1 and 2, comprises another cylindrical drum 80 having an array of second-intermediate-shape members 81 disposed on its cylindrical surface. As shown in FIGS. 1 and 2, the array of second-intermediate-shape members on the second shaping-transfer cylinder 44 is like the twenty row array of first-intermediate-shape members 71 on the first shaping-transfer cylinder 43 described hereinbefore.

Figure 9:
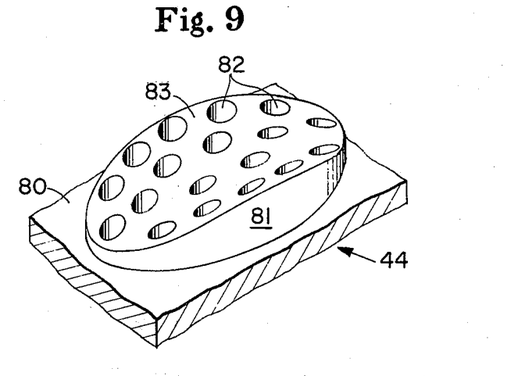
FIG. 9 is an enlarged scale, fragmentary perspective view showing a second intermediate-shape member on a second shaping-transfer cylinder.

Each of the second-intermediate-shape members 81, FIG. 9, has a plurality of passageways 82, here shown as eighteen in number, which extend radially inwardly from its face 83. Face 83 is configured to have a shape intermediate the shape of the face 73 of a first-intermediate shape member 71, FIG. 8, and the shape of the top surface 74 of a mold 31, FIG. 10.

Both of the cylindrical drums 70 and 80 are provided with internal manifolds (not shown) which communicate with passageways 72 and 82 respectively to enable securing preforms to faces 73, 83 by vacuum, and to enable pneumatic removal or blow-off of preforms 35 from faces 73, 83 in the manner described hereinbefore with respect to cutter roll 41.

The intermediate-shaping cylinders 43, 44, FIG. 2, are secured to shafts 42a and 44a respectively which are rotatably secured to frame 23 so that a first or initial transfer station 91 is formed intermediate the cutter roll 42 and the first shaping-transfer roll 43; so that a second or intermediate transfer station 92 is formed intermediate cylinders 43 and 44; and so that a third or final transfer station 93 is formed intermediate the second shaping-transfer cylinder 44 and the flight 30 of molds 31.

The means 45, FIG. 1, for rotatably mounting and rotating rolls 41, 42 and cylinders 43, 44 to frame 23 in predetermined relations comprises shafts 41a, 42a, 43a, 44a, 95 and 96, and gears 98 through 107 inclusive. The gear ratios are so chosen and the gears are so angularly indexed that the following predetermined relations are established; the anvil roll 41 will creep rotationally with respect to the cutter roll 42; rolls 41, 42 will have substantially the same surface velocities; each area 62 on cutter roll 42 which is encircled by a cutting edge 60 will face a first-intermediate-shape member 71 at the first transfer station 91, FIG. 11; each first-intermediate-shape member 71 will face a second-intermediate-shape member 81 at the intermediate transfer station 92, FIG. 12; and each second-intermediate-shape member 81 will face a mold 31 at the final transfer station, 93, FIG. 13.

In the preferred embodiment apparatus 21, FIGS. 1 and 2, the creeping rotational relationship of anvil roll 41 to cutter roll 42 is achieved by virtue of rolls 41 and 42 having slightly different outer diameters and by rotating them at substantially identical surface velocities. For example, if gears 102, 103, 104, 105, 106 and 107 have 99, 99, 89, 99, 120, and 108 teeth respectively, and rolls 41, 42 have 33, 93 and 33, 91 centimeter diameters respectively, the cutter roll 42 will rotate approximately 1.0011 revolutions for each revolution of the anvil roll 41 and the rolls 41, 42 will have substantially identical surface velocities. Thus, the cutter roll 42 will advance rotationally approximately one revolution with respect to anvil roll 41 for each 900 revolutions of anvil roll 41.

Rotational creeping as described above causes the cutting edges 60 on cutter roll 42 to distribute their wear over substantial, band-shape areas of the imperforate thermoplastic outer layer 58 of the cover 56 of anvil roll 41. By so distributing cutter induced wear over substantial areas of layer 58 of anvil roll 41, the service life of anvil roll 41 is materially greater than an anvil roll which is so rotationally indexed with a cutter roll that the anvil roll does not creep rotationally with respect to the cutter roll.

Figure 11:
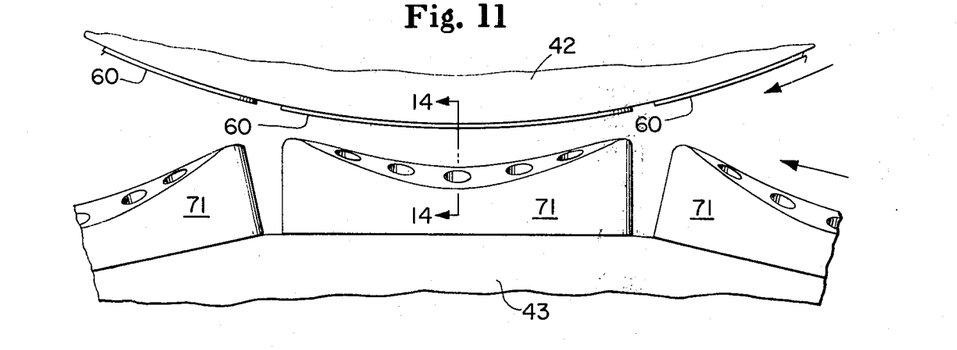
FIG. 11 is an enlarged scale, sectional view showing adjacent portions of a cutter roll and a first shaping-transfer cylinder at a first transfer station.
Figure 12:
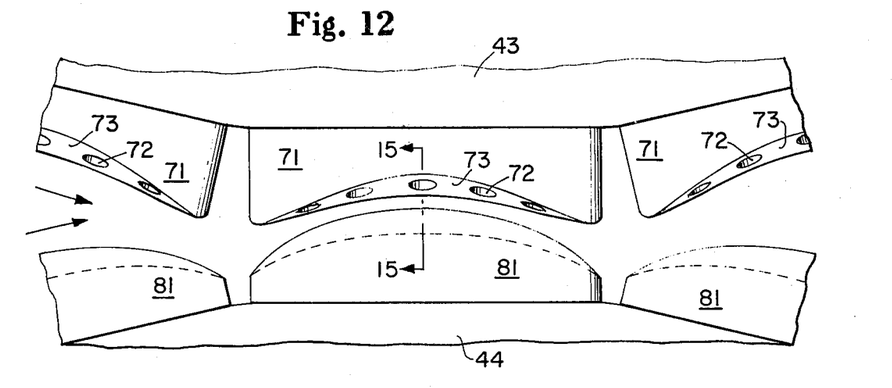
FIG. 12 is an enlarged scale, sectional view of adjacent portions of first and second shaping-transfer cylinders at an intermediate transfer station.
Figure 13:
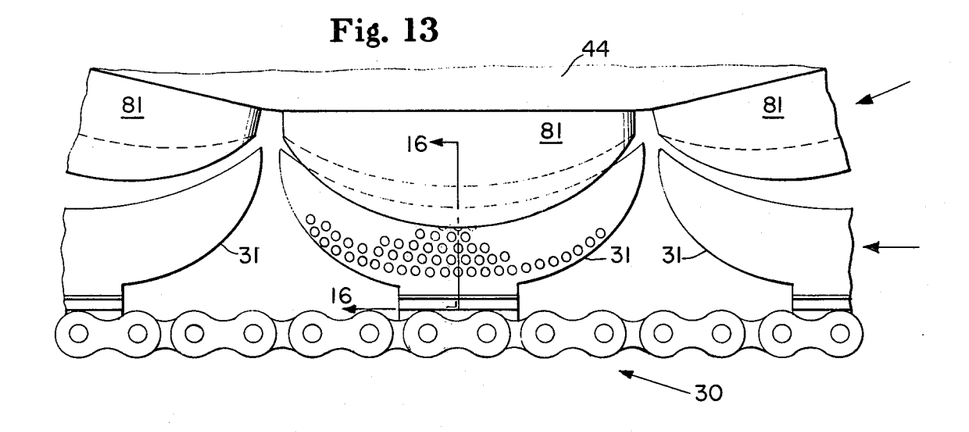
FIG. 13 is an enlarged scale, sectional view of adjacent portions of a second shaping-transfer cylinder and a flight of cooking molds at a final transfer station.
Figure 14:
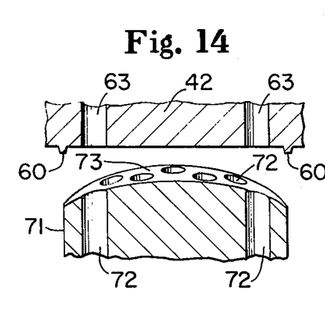
FIGS. 14, 15, and 16 are sectional views taken along lines 14—14, 15—15, and 16—16 of FIGS. 11, 12, and 13 respectively.
Figure 15:
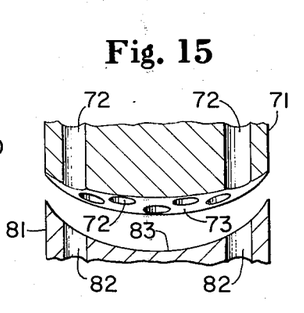
Figure 16:
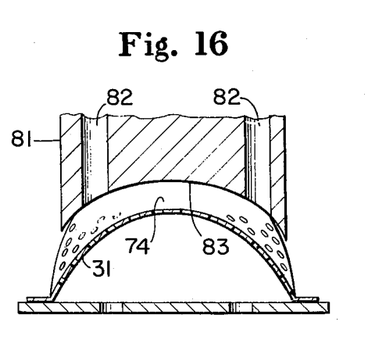

Rotary valving means 46, FIG. 1, are provided on cutter roll 42, and the two shaping-transfer cylinders 43, 44 to apply vacuum or pressurized gas to the manifolds and passageways of roll 42 and cylinders 43, 44 in timed relation with their rotation so that: preforms 35 will be secured by vacuum to the areas 62 of the cutter roll 42 to advance the preforms 35 from cutting nip 66 to the first transfer station 91, FIG. 2; the preforms 35 will be pneumatically transferred from the areas 66 on cutter roll 42 to the faces 73 of the first-intermediate-shaping members 71 at the first transfer station 91, FIG. 11; the preforms 35 will thence be secured by vacuum to faces 73 so that the preforms 35 are forwarded to the second transfer station 92, FIG. 12, by rotating cylinder 43 counterclockwise as viewed in FIG. 2; the preforms 35 are pneumatically transferred from the faces 73 of the first-intermediate-shaping-members 71 to the faces 83 of the second-intermediate-shaping-members 81 at the intermediate transfer station 92, FIG. 12; the preforms 35 are secured by vacuum to the faces 83 so that the preforms 35 are forwarded to the final transfer station 93 by rotating cylinder 44 clockwise as viewed in FIG. 2; and the preforms 35 are pneumatically removed from the faces 83 of the second-intermediate-shape members 81 at the final transfer station 93, FIG. 13, to pneumatically transfer the preforms 35 to the flight 30 of molds 31. It will be understood that the terms vacuum and pressurized gas as used hereinabove mean a sufficiently high vacuum and sufficiently pressurized gas respectively to accomplish the stated functions.

A suitable valving means 46 is disclosed in U.S. Pat. No. 3,520,248, and is shown therein in FIGS. 5 and 6.

Referring now to FIGS. 11 through 16 inclusive, the faces 73, 83 of the intermediate-shape members 71, 81 respectively are so shaped that they progressively impart greater degrees of curvature to preforms 35 being forwarded through cut-and-transfer apparatus 21. In this manner, each preform 35 is incrementally reshaped from its arcuate shape when cut, FIG. 4, to the substantially different shape of a finished chip or product 36, FIGS. 5 and 6. Such progressive, incremental shape changing provides a means for more positively and reliably achieving a substantial shape change of a flexible preform than if the substantial shape change were attempted in one step.

Referring to FIG. 12, the first-intermediate-shape members 71 are so shaped with respect to the second-intermediate-shape members 81 that, as cylinders 43 and 44 rotate in the rotationally indexed relation as shown, convex portions of the second-intermediate-shape members 81 extend into concave portions of the first-intermediate-shape members 71 at the intermediate transfer station 92. That is, were the cylinders 43 and 44 not driven in such a manner that members 71 and 81 were indexed at the intermediate transfer station 92, portions of members 71 and 81 would interfere at the intermediate transfer station 92. The relation of members 71 to members 81 described above is hereafter referred to as a nesting, non-contacting relation.

As shown in FIG. 13, there is also a nesting, non-contacting relation intermediate the second-shaping-transfer members 81 and the molds 31 at the final transfer station.

Nesting, non-contacting relations intermediate the first and second shaping-transfer members 71, 81, FIG. 12, and intermediate the second-shaping-transfer members 81 and molds 31, FIG. 13, reduce the lengths of the free-flight paths that preforms 35 must traverse as compared to the free-flight path lengths that must be traversed intermediate non-nesting members of prior art apparatuses. Reduced free-flight path lengths provide more positive shape control of flexible preforms because such factors as windage are materially reduced.

Referring again to FIG. 2 anvil roll 41 is spaced remotely from the flight 30 of molds 31 whereby the thermoplastic periphery of the anvil roll is protected from the hot cooking zone 110 of the cooking machine 20. That is, by being remotely spaced, anvil roll 41 is protected from deleterious heat adjacent the flight 30 of molds 31 of cooking machine 20.

Infeed means 24, FIGS. 1 and 2, are provided for forwarding a substantially unstressed, endless web 25, FIG. 2, to the cutting nip 66 in timed relation with the rotation of anvil roll 41 and cutter roll 42 so that the web 25 can be converted into preforms 35, FIGS. 3 and 4, and a lace-like strip of scrap 67, FIG. 1. The web 25 may originate, for instance, in a dough sheeting mill or extruder, now shown.

Scrap removal means 28, FIG. 2, are provided for removing the lace-like strip of scrap 67 issuing from cutting nip 66. The scrap removal means 28 may forward the strip of scrap 67 to means not shown for recycling the scrap or means for disposing of the scrap.

Drive means 32, FIG. 1, comprises means for driving the infeed means 24, the scrap removal means 28, the flight 30 of molds 31, and means 45 of the cut-and-transfer apparatus 21 in predetermined timed relations so that a continuous ribbon or web 25 of dough is converted, at cutting nip 66, into a multiplicity of preforms 35 and a lace-like strip of scrap 67; the preforms 35 are incrementally reshaped from their initial arcuate shape, FIG. 4, to their final saddle shape, FIG. 5; and the preforms 35 are deposited onto the top surfaces 74 of molds 31 whereon they are forwarded through a cooking zone and converted into products such as crisp, uniformly saddle-shape chips 36, FIGS. 5 and 6.

Exemplary means such as infeed means 24, scrap removal means 28, and drive means 32 are disclosed in the hereinbefore referenced and incorporated U.S. Pat. No. 3,520,248.

While the preferred embodiment cut-and-transfer apparatus 21 comprises two shaping-transfer cylinders 43, 44 and two sets of intermediate shaping members 71, 81, it is apparent that one or more transfer cylinders comprising intermediate shaping members would be sufficient or desirable to achieve a lesser or greater degree respectively of shape change than embodied in the preferred apparatus 21. Furthermore, the benefit derived from remotely locating anvil roll 41 can be achieved by providing smooth surfaced, perforate, spacing-transfer cylinders (not shown) rather than shaping-transfer cylinders 43, 44 intermediate cutter roll 42 and the flight 30 of molds 31. Moreover, the benefit associated with the creeping relation of anvil roll 41 to cutter roll 42, and the benefit associated with incrementally reshaping preforms 35 from an initial shape to a substantially different final shape are each available independently as well as together as in the preferred cut-and-transfer apparatus 21.

While particular embodiments of the present invention have been illustrated and described, it will be obvious to those skilled in the art that various changes and modifications can be made without departing from the spirit and scope of the invention, and it is intended to cover in the appended claims all such changes and

What is claimed is:

1. An improved cut-and-transfer apparatus including rotary cutting means and a flight of molds for cutting preforms having an as-cut shape from a flexible web and for transferring each of the preforms to a said mold having a final shape substantially different from said as-cut shape, said improvement comprising means intermediate said cutting means and said flight of molds for incrementally reshaping the preforms from said as-cut shape to said final shape, said means for incrementally reshaping comprising at least one shaping-transfer cylinder having an array of intermediate-shape members on its periphery, each of said members having a radially outwardly oriented face of a shape intermediate said as-cut shape and said final shape, said apparatus further comprising means for rotating said cylinder in timed relation with said cutter means and said flight of molds, means for transferring said performs to said faces adjacent said cutter means, and means for transfering said performs from said faces to said molds.

2. The improved cut-and-transfer apparatus of claim 1 wherein said members are so shaped and disposed with respect to said molds that said members non-contactingly nest with said molds when said preforms are transferred to said molds.

3. An apparatus for cutting arcuate-shape preforms from a flexible web, for transferring the preforms to final-shape molds, and for uniformly shaping the preforms to a predetermined intermediate shape prior to transferring the preforms to the molds, said apparatus comprising:
a frame;
a cutter roll rotatably secured to said frame, said cutter roll having an array of preform cutting edges on its periphery;
an anvil roll rotatably secured to said frame so that a cutting nip is formed intermediate said cutter roll and said anvil roll, and so that said cutting edges contact the periphery of said anvil roll adjacent said cutting nip;
an intermediate shaping-transfer cylinder rotatably secured to said frame so that a first transfer station is formed intermediate one of said rolls and said cylinder;
means for rotating said rolls and said cylinder in timed relation;
means for forwarding said web to said cutting nip in timed relation with the rotation of said rolls so that said cutting edges cut arcuate-shape preforms from the web;
means for securing said preforms to said one roll to forward said preforms to said first transfer station;
means for transferring said preforms to said shaping-transfer cylinder at said first transfer station, said shaping-transfer cylinder having a plurality of intermediate-shape members disposed about its periphery so that each preform is transferred onto a radially outwardly oriented face of an intermediate-shape member, each said face having a shape intermediate said arcuate shape and said final shape;
means for securing said preforms to said faces of said intermediate-shape members to forward said preforms to an other transfer station where the preforms can be transferred to said molds; and,
means for transferring said preforms from said intermediate-shape members to said molds at said other transfer station.

4. The apparatus of claim 3 wherein:
said cutter roll is said one roll;
said securing means comprises vacuum holding means; and
said transfer means comprises pneumatic blow-off means.

5. The apparatus of claim 4 wherein:
said anvil roll has a peripheral surface which is sufficiently soft with respect to the hardness of said cutting edges to substantially confine cutting induced wear to said anvil roll; and,
said means for rotating said rolls comprises means for said anvil roll to creep rotationally with respect to said cutter roll to circumferentially distribute any said wear induced on the periphery of said anvil roll by said cutting edges.

6. The apparatus of claim 3 wherein said intermediate-shape members are configured and disposed to non-contactingly nest with respect to said molds at said other transfer station.

7. The apparatus of claim 6 wherein:
said cutter roll is said one roll;
said securing means comprises vacuum holding means; and,
said transfer means comprises pneumatic blow-off means.

8. The apparatus of claim 7 wherein:
said anvil roll has a peripheral surface which is sufficiently soft with respect to the hardness of said cutting edges substantially confine cutting induced wear to said anvil roll; and,
said means for rotating said rolls comprises means for said anvil roll to creep rotationally with respect to said cutter roll to circumferentially distribute any said wear induced on the periphery of said anvil roll by said cutting edges.

9. The apparatus of claim 3 wherein:
said cutter roll is said one roll;
said anvil roll has a resilient imperforate periphery;
said means for securing said preforms to said one roll and said means for transferring said preforms from said one roll comprises a plurality of radially extending passageways encircled by each cutting edge and means for alternately connecting sufficiently pressurized sources of vacuum and pressurized gas to said passageways in timed relation with the rotation of said one roll to achieve said securing and said transferring respectively; and
said means for securing said preforms to said intermediate-shape members and said means for transferring said preforms from said intermediate-shape members comprises a plurality of radially extending passageways through each of said intermediate-shape members and means for alternately coupling sufficiently pressurized sources of vacuum and pressurized gas to said passageways in timed relation with the rotation of said intermediate shaping-transfer cylinder to achieve said securing and said transferring respectively.

10. In an improved machine for making and cooking non-planar, uniformly shaped articles which machine includes a frame, means for receiving a web of dough, means for cutting preforms from said web, a plurality of cooking molds, means for moving said molds into and through a cooking zone, and means for placing said preforms on said cooking molds while said molds are moving, the improvement comprising:

- a cutter roll rotatably secured to said frame, said cutter roll having an array of preform cutting edges on its periphery;
- an anvil roll rotatably secured to said frame so that a cutting nip is formed intermediate said cutter roll and said anvil roll, and so that the cutting edges of said cutters contact the periphery of said anvil roll adjacent said cutting nip;
- an intermediate shaping-transfer cylinder rotatably secured to said frame so that a first transfer station is formed intermediate one of said rolls and said cylinder;
- means for rotating said rolls and said cylinder in timed relation;
- means for forwarding a web of dough to said cutting nip in timed relation with the rotation of said rolls so that the cutting edges cut arcuate-shape preforms from the web;
- means for securing said preforms to said one roll to forward said preforms to said first transfer station;
- means for transferring said preforms to said shaping-transfer cylinder at said first transfer station, said shaping-transfer cylinder having a plurality of intermediate-shape members disposed about its periphery so that each preform is transferred onto a radially outwardly oriented face of an intermediate-shape member, each said face having a shape intermediate said arcuate shape and the shape of a said cooking mold;
- means for securing said preforms to said faces of said intermediate-shape members to forward said preforms to an other transfer station where the preforms can be transferred to said cooking molds; and,
- means for transferring said preforms from said intermediate-shape members to said cooking molds at said other transfer station.

11. The improved machine of claim 10 wherein said intermediate-shape members are configured and disposed to non-contactingly nest with respect to said cooking molds at said other transfer station.

* * * * *